(12) United States Patent  (10) Patent No.: US 9,249,983 B2
Pagenstert  (45) Date of Patent: Feb. 2, 2016

(54) AIR SUPPLY SHUTTER FOR LIVESTOCK BUILDINGS

(75) Inventor: Winfried Pagenstert, Rechterfeld (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 1722 days.

(21) Appl. No.: 12/077,655

(22) Filed: Mar. 20, 2008

(65) Prior Publication Data

US 2008/0242215 A1   Oct. 2, 2008

(30) Foreign Application Priority Data

Mar. 23, 2007  (DE) ............... 20 2007 004 497 U (51) Int. Cl.
| | |
|---|---|
| F24F 13/00 | (2006.01) |
| F24F 13/14 | (2006.01) |
| A01K 1/00 | (2006.01) |
| E06B 3/08 | (2006.01) |
| E06B 7/02 | (2006.01) |

(52) U.S. Cl.
CPC ............... *F24F 13/14* (2013.01); *A01K 1/0064* (2013.01); *E06B 3/08* (2013.01); *E06B 7/02* (2013.01); *F24F 13/1406* (2013.01); *F24F 13/1486* (2013.01)

(58) Field of Classification Search
CPC ....... F24F 13/06; F24F 2013/06; F24F 13/10; F24F 2013/10; F24F 13/14; F24F 2013/14; F24F 13/1406; F24F 2221/17; A01K 1/0064
USPC ................... 454/118, 284; 119/448, 493, 500
See application file for complete search history.

(56) References Cited

U.S. PATENT DOCUMENTS

| | | | | | |
|---|---|---|---|---|---|
| 454,096 | A | * | 6/1891 | Wanless | 454/307 |
| 906,243 | A | * | 12/1908 | Lee | 454/284 |
| 1,972,274 | A | | 9/1934 | Quinlan et al. | |
| 2,535,933 | A | | 12/1950 | Kubatzky | |
| 2,719,476 | A | * | 10/1955 | Dovolis | 454/323 |
| 3,116,678 | A | * | 1/1964 | Hierta | 454/143 |
| 3,185,181 | A | * | 5/1965 | Demyan | 454/309 |
| 3,358,577 | A | * | 12/1967 | Thomson | 454/320 |
| 3,503,320 | A | | 3/1970 | Geromet | |
| 3,703,141 | A | * | 11/1972 | Pernoud | 454/155 |
| 4,241,871 | A | * | 12/1980 | Newell et al. | 236/49.3 |

(Continued)

FOREIGN PATENT DOCUMENTS

| | | |
|---|---|---|
| DE | 1 778 267 | 3/1972 |
| DE | 2 246 597 | 3/1974 |

(Continued)

*Primary Examiner* — Alissa Tompkins
*Assistant Examiner* — Phillip E Decker
(74) *Attorney, Agent, or Firm* — Price Heneveld LLP (57) ABSTRACT

An air supply shutter for ventilating closed buildings includes a marginal frame with interconnected upper, lower and lateral frame members to define a centrally disposed air vent opening having inlet and outlet sides. A shutter flap is pivotally mounted on the frame for rotation about a generally horizontal axis between closed and open positions. A coupler is connected with the shutter flap and configured for engagement with an activator for shifting the shutter flap between the closed and open positions. The upper frame member includes an air guiding wall which is disposed on the outlet side of the air vent opening, faces the air vent opening, and extends upwardly at a predetermined angle to deflect the air flowing through the air vent opening.

21 Claims, 4 Drawing Sheets

(56) References Cited

U.S. PATENT DOCUMENTS

| | | | |
|---|---|---|---|
| 4,382,460 A * | 5/1983 | Ben-Tal | 160/236 |
| 4,404,990 A | 9/1983 | McCabe | |
| 4,519,151 A * | 5/1985 | Johnson | 38/102.9 |
| 4,576,331 A * | 3/1986 | Harwell | 454/284 |
| 4,715,268 A * | 12/1987 | Tanner | 454/256 |
| 5,520,580 A * | 5/1996 | Showalter et al. | 454/273 |
| 5,759,097 A * | 6/1998 | Bernoville et al. | 454/162 |
| 6,099,406 A | 8/2000 | Demster | |
| 6,475,078 B1 * | 11/2002 | Borcherding | 454/259 |
| 8,206,058 B2 * | 6/2012 | Vrondran et al. | 404/25 |
| 2007/0060040 A1 * | 3/2007 | Ogura et al. | 454/319 |
| 2008/0036122 A1 * | 2/2008 | Hawkins | 264/518 |
| 2008/0220713 A1 * | 9/2008 | Kim et al. | 454/339 |
| 2008/0295406 A1 * | 12/2008 | Kollman et al. | 49/74.1 |
| 2010/0073643 A1 * | 3/2010 | Nasukawa et al. | 353/88 |

FOREIGN PATENT DOCUMENTS

| | | |
|---|---|---|
| DE | 9108603 U1 | 9/1991 |
| DE | 296 15 370 U1 | 11/1996 |
| DE | 10 2005 024 527 A1 | 11/2006 |
| FR | 688657 | 8/1930 |
| RU | 2140612 | 10/1999 |
| RU | 2003109235 | 11/2004 |
| SU | 985627 | 12/1982 |
| WO | WO 98/30085 | 7/1998 |
| WO | WO 98/30086 | 7/1998 |
| WO | WO 9830085 A1 * | 7/1998 |
| WO | WO 9830086 A1 * | 7/1998 |

* cited by examiner

Fig. 4

Fig. 3

AIR SUPPLY SHUTTER FOR LIVESTOCK BUILDINGS

CLAIM OF PRIORITY

Applicants hereby claim the priority benefits under the provisions of 35 U.S.C. §119, basing said claim of priority on German Patent Application Serial No. 20 2007 004 497.6, filed Mar. 23, 2007. In accordance with the provisions of 35 U.S.C. §119 and Rule 55(b), a certified copy of the above-listed German patent application will be filed before grant of a patent.

BACKGROUND OF THE INVENTION

The invention relates to an air supply shutter for ventilating closed buildings, comprising a frame provided with an air vent, which is defined by an upper frame profile, a lower frame profile, two lateral frame profiles which join the upper and lower frame profiles to each other, a shutter flap which is pivotably mounted on the frame about a horizontal axis such that it closes the air vent when in the closed position and releases the air vent when in the open position, and a coupling device for coupling the shutter flap to an actuating device by means of which the shutter flap can be moved from the open position into the closed position and/or vice versa. The invention also relates to a modular kit for such an air supply shutter.

Air supply shutters of the aforementioned kind are used, in particular, for ventilating livestock buildings. To this end, the air supply shutters may be wholly or partially used as supporting or non-supporting elements in a wall opening, thus allowing controlled opening and closing of such a wall opening.

In particular when such air supply valves for livestock buildings are used for sensitive livestock, the air supply shutters must meet high standards in respect of their air supply and sealing characteristics. It is desirable, on the one hand, for example, that the passage of air from the air supply shutter into the stable be designed in such a way that a stream of air directed to the ceiling area of the livestock building is obtained, and that this stream of air reaches the floor area after ventilating almost the entire enclosed space due to eddy formation. It is known to arrange air guiding flaps on such air supply shutters in order to achieve this desired guidance of airflow, but it is not possible to ensure with such air guiding flaps that the desired guidance of airflow is achieved with all shutter positions between the open and the closed shutter positions. A first object of the invention is to improve the guidance of airflow by such an air supply shutter.

Another problem with known air supply shutters consists in the fact that the intake air enters at high speeds, particular when the opening cross section is small. This often leads to unwanted airflow directed straight at the animals being kept on the floor of the building, which may cause diseases in the animals. Another object of the invention is to prevent such unwanted airflow in the region of small opening cross sections.

Another requirement that air supply shutters are expected to satisfy, particularly when they are being used in geographical regions with strong climatic variations, is reliable sealing in the closed state. Since air supply shutters are frequently disposed in dirty surroundings, and it is desirable to organize maintenance and cleaning intervals over the long term, this requirement in respect of sealing must also be met under adverse ambient conditions. Another object of the invention is to improve the imperviousness of known air supply shutters without increasing the sensitivity of the air supply shutter to dirt.

Finally, a general requirement to be met by air supply shutters of the kind initially described is that the mounting depth of the air supply shutter is as small as possible in order to prevent the air supply shutter from protruding inwards and/or outwards when mounted in thin walls, as a result of which increased contamination in the form of deposits can occur.

SUMMARY OF THE INVENTION

These objects are achieved, firstly, with an air supply shutter of the kind initially specified, in which the upper frame profile is provided on the outlet side of the air vent with an air guiding wall section which faces the air vent and runs slantingly upwards.

By means of the air supply shutter developed in this manner, the stream of supplied air is already deflected when passing through the air vent in the frame, thus achieving substantially improved air guiding in the direction of the ceiling of the building being ventilated. The invention makes use of the discovery that the normally horizontal direction in which the stream of supplied inlet air flows when guided horizontally through the air passage cross section can only be guided in the desired direction with considerable aerodynamic effort, in contrast to which the aerodynamic effort can be substantially reduced or even obviated when a certain design of the upper frame profile affects the airflow. By integrating the frame profile into the airflow control in such a manner, the mounting depth of the air supply shutter can be simultaneously reduced, since any aerodynamic guiding structures connected to the frame profile are obviated or embodied in more compact form. The upwardly slanting air guiding wall section may form the entire inwardly facing wall section of the upper frame profile, or a part of this inwardly facing wall section, which is limited, for example, to a certain proportion of the length and/or a certain proportion of the depth of the upper frame profile. If the upwardly slanting air guiding wall section is limited to a certain proportion of the depth of the upper frame profile, it is preferred that the air guiding wall section be disposed on the side of the upper frame profile facing the interior of the building.

It is preferred, in particular, that the air guiding wall section extends across the entire length of the upper frame profile. In this way, the advantageous air guidance is achieved across the entire width of the air supply shutter.

It is also preferred when the upper and lower frame profiles are of identical cross-sectional design and are installed mirror-invertedly to each other about a horizontal plane. It is possible in this way to reduce the production costs for the inventive air supply shutter, on the one hand, because a profile made of a single extrusion tool may be used for the lower and the upper frame profiles. On the other hand, the mounted position of the inventive air supply shutter is made more variable as a result, since an appropriately slanted air guiding wall section is embodied not only on the upper but also on the lower frame profile as a result of the mirror-symmetrical arrangement.

According to another aspect of the invention for solving the problems initially mentioned, the air supply shutter initially specified, or the inventive developments of said air supply shutter described in the foregoing, is preferably configured in such a way that wall surfaces extending in the direction of the air vent are disposed on the lateral frame profiles, such that they laterally seal an opening cross section resulting in a partial opening region of the shutter flap adjacent to the closed position of the shutter flap. This development of the invention achieves a situation, especially when the shutter flap is opened only slightly and thus provides a small opening cross section, with the result that high flow velocities and pressure differences arise, in which the airflow escapes laterally from the air passage cross section, thus causing unwanted parts of the airflow to flow in a lateral direction that slants towards the floor. The invention makes use here of the discovery that such unwanted airflow movements occur particularly in the case of small opening angles, and hence that complete lateral sealing of the region to the side and in the direction of airflow downstream from the air vent is not required when the opening angles of the shutter flap are larger, which means it is possible to avoid the wall surfaces protruding into the interior of the livestock building by an amount that makes maintenance more difficult and which fosters the collection of dirt. In particular, the wall surfaces may be designed in such a way that they seal with precision the lateral gap that is formed when the shutter flap is partially opened, up to a certain opening angle, for example by giving each wall surface a substantially triangular shape and having it face with an acute angle in the direction of the horizontal pivot axis of the shutter flap.

It is particularly preferred when the wall surfaces extend so far in the direction of air passage that, when the shutter flap moves from the closed position to a position in which an opening cross section of 20 percent to 40 percent, preferably 30 percent of the air passage surface is released, a plane of air passage resulting in this position is laterally sealed. It has been found that a particularly high level of efficiency of the desired airflow control can be achieved when there is lateral coverage in this opening range and that when the shutter flap is opened beyond this opening range it is possible to do without lateral coverage, since in that case the airflow velocities and pressure differences arising do not cause disadvantageous airflow in the lateral or downwardly slanted direction.

The embodiment with lateral wall surface is also preferred when the horizontal axis is disposed in the lower region of the frame and the wall surfaces extend from an upper region of the lateral frame profiles. In this way, due to the arrangement of the horizontal axes in the lower region, a preferred airflow into the ceiling area of the building is made possible from the outset when the shutter flap is pivoted inwards towards the opening, and with this constellation any lateral escape of air is prevented when the opening cross section is small.

According to a further aspect of the invention, an air supply shutter of the kind initially specified, or an air supply shutter with the previously described constructions, which comprise an air guiding flap pivotably mounted on the upper frame profile, which extends across the entire length of the upper frame profile, and a coupling section which is inserted into a matching receiving portion on the upper frame profile, is further developed, in order to solve the problems initially described, by embodying the coupling section as an edge of rounded cross section, which is inserted into the receiving portion embodied as a corresponding receiving groove, and by providing the rounded edge with a locking protrusion extending across the entire length of the edge and which cooperates with at least one, preferably with a plurality of locking grooves extending across the entire length of the receiving groove in order to fix one or several positions of the air guiding flap.

This inventive embodiment of the air supply shutter allows an air guiding flap to be securely fixed to the upper frame profile, and the air guiding flap to be adjustable even in the case of long upper frame profiles, without an ensuing risk of the air guiding flap breaking. It has been found that, especially when long frame profiles with correspondingly long air guiding flaps are used, unwanted deviations of the air stream from the desired direction occur due to torsion of the air guiding flap, on the one hand, and that the air guiding flap may break or tear, on the other hand. In order to prevent this from happening, the invention provides that the air guiding flap be fixed in the desired flap position by a locking protrusion which engages in one or several locking grooves. The locking protrusion and the locking groove extend across the entire length of the air guiding flap and the upper frame profile, so that the force needed for retaining the two parts in a preselected position is not concentrated in a single area, and the air guiding flap therefore can withstand greater torsional forces.

It should be understood in this regard that in this development the coupling section and the receiving portion may also be conversely configured, i.e., the coupling section is embodied on the upper frame profile and the receiving portion on the air guiding flap. It should likewise be understood that the locking protrusion and the locking groove may likewise be conversely configured, i.e., the locking groove may be embodied on the coupling section and the locking protrusion may be embodied on the receiving portion, without deviating here from the inventive principle.

It is particularly preferred when the air guiding flap provides an air guiding surface aligned with the air guiding wall section when positioned such that the locking protrusion has latched into the locking groove or one of the locking grooves. In this way, particularly efficient guidance of airflow in the direction of the ceiling of the building to be ventilated is achieved.

The embodiments of the air guiding flap may be developed further with the air guiding flap being a multi-chamber hollow profile, preferably a multi-chamber hollow profile extruded in a direction along its pivot axis. On the one hand, this increases the stability of the air guiding flap, without increasing the amount of material needed to produce it. On the other hand, an insulating effect can be achieved by which formation of condensation water and, where relevant, of ice on the air guiding flap is prevented.

According to another aspect of the invention, an air supply shutter of the kind initially specified, or an air supply shutter with the previously described constructions is further developed, in order to solve the problems initially described, such that the shutter flap is pivotably mounted about the horizontal axis in the region of an edge on the bearing side and in the closed position sealingly abuts the upper frame profile at a sealing edge opposite said bearing side edge. By means of this development of the invention, an improved seal between the shutter flap and the frame is achieved, as a result of which the air supply shutter is better able to prevent unwanted passage of air in the closed position than known air supply shutters.

Particularly when the air supply shutter is provided with an air guiding wall section of the kind previously described, it is preferred that the sealing edge sealingly abuts the slanting air guiding wall section in the closed position. By means of this construction, a beneficial double utilization of the air guiding wall section is realized, firstly, in that said wall section is slanted in such a way that it causes favorable air guidance, on the one hand, and, on the other hand, that this slanting configuration of the air guiding wall section is used to serve as a countersealing face for the upper edge of the shutter flap, which leads to a particularly favorable seal arrangement and hence to reliable sealing.

It is particularly preferred when an elastomeric, preferably post-coextruded seal is molded on the sealing edge. The sealing effect is further enhanced in this way, without reducing the robustness or significantly increasing the production effort involved.

It is also preferred when the wall surface on the inlet side runs as far as the sealing edge in such a way that the stream of air passing through the vent comes into contact with the wall surface in the open or closed position of the shutter flap, in particular when the wall surface extends in a planar manner as far as the sealing edge. This prevents breakaway at the edge, on the one hand, and on the other hand any eddy formation in the region of the shutter flap, and particularly of the sealing edges, which could other lead to loss of airflow and formation of ice by condensation water. It is preferred that the wall surface have a non-stepped, planar or slightly domed profile.

It is further preferred that the wall surface on the inlet side ends at the sealing edge in a sharp breakaway edge. What is meant here by a sharp breakaway edge is that the breakaway edge is embodied in such a way, in particular, that no stationary eddies can form in the region of the sealing edges. Such stationary eddies frequently lead to formation of condensation water and can lead, in combination with cooling in the region of the edge due to underpressure, to the formation of ice, which impairs the seal between the edge and the countersealing surface. A sharp-edged breakaway edge can be achieved, in particular, by bending the wall surfaces on the inlet side, in the region of the edge, to an angle of more than 90 degrees, preferably more than 120 degrees. It is also advantageous when the breakaway edge is embodied with a radius of less than two millimeters, in particular less than one millimeter.

The air supply shutter according to the invention may be further developed with a restoring device which exerts a force on the shutter flap in the opposite direction to an opening or closing force caused by the actuating means, and hence into the closed or open position, respectively. This realizes a construction in which the air supply shutter is passively opened or closed, and in which a closing or opening force is exerted on the shutter flap by the actuation means in the opposite direction to this passive opening and closing.

The restoring device may basically comprise spring elements, for example, such as spiral, torsion or pneumatic springs. However, it is particularly preferred when the restoring device includes a weight which is disposed on the shutter flap at a distance from the horizontal axis thereof and exerts a force of weight on the shutter flap which is directed in the installed position past the horizontal axis, and is directed, in particular, in such a way that it causes the shutter flap to open. In this embodiment, therefore, the weight on the shutter flap may be arranged on the side facing towards the interior of the building and offset towards the interior in relation to the horizontal axis, thus causing passive opening of the shutter flap.

Yet another preference is when the air supply shutter of the invention is further developed by embodying on each of the lateral frame profiles a sealing surface which lies parallel to the shutter flap in the closed position, and against which the shutter flap abuts with a lateral sealing region in the closed position. Compared to known air supply shutters, in which a buffing seal acts between the edge of the shutter flap and the inner wall surfaces of the lateral frame profile, this development allows substantially improved sealing efficiency and simultaneously a substantially longer service life of the seal, since this is actuated with a high sealing force, on the one hand, and is not exposed to any wear and tear, on the other hand.

Finally, the air supply shutter according to the invention may be developed still further by the shutter flap being pivotably mounted about the horizontal axis in the region of an edge on the bearing side and being sealed in the closed position against the frame by means of two elastomeric seals. This development of the invention is based on the realization that it is generally necessary, in order to ensure the required ease of operation in the region of the horizontal axle bearing, to leave a gap in the region of the bearing side edge, but which can lead in the closed operating state of the air supply shutter to unwanted leakage of air. It is preferably provided, therefore, that a second elastomeric seal be disposed in this region, which in the closed position seals this gap between the shutter flap and the lower frame profile.

Like the first elastomeric seal, the second elastomeric seal may preferably be a post-coextruded seal.

The air supply shutter according to the invention may be further developed by embodying the shutter flap as a multi-chamber hollow profile, in particular as a multi-chamber hollow profile extruded in a direction along the horizontal pivot axis. On the one hand, this increases the stability of the shutter flap, without increasing the amount of material needed to produce it. On the other hand, it is possible to achieve an insulating effect. Due to the fact that, in the closed position, the shutter flap is the only insulating wall which closes the vent, this insulating effect is critical for the thermal insulation of the ventilated room. It is also possible by this means to prevent the formation of condensation water and, where relevant, the formation of ice on the shutter flap.

It is particularly preferred in this regard when the shutter flap is subdivided by means of at least one inner partition which lies approximately parallel to the wall surface of the shutter flap facing the inlet side in the closed position and which extends parallel to the horizontal pivot axis. Alternatively, or additionally, it is preferred when the shutter flap is subdivided by means of at least one inner partition which lies approximately perpendicular to the wall surface of the shutter flap facing the inlet side in the closed position and which extends parallel to the horizontal pivot axis. This achieves a subdividing of the shutter flap into a plurality of chambers which can be produced during the extrusion production process of the shutter flap. In addition, it is possible to achieve advantageous subdividing into chambers which are staggered in relation to each other in the direction of thermal insulation when the shutter flap is closed, on the one hand, and in the direction of airflow when the flap is (partially) open, on the other hand.

Another aspect of the invention comprises a modular kit for an air supply shutter having the construction described in the foregoing, said modular kit comprising standardized lateral frame profiles of a predefined size, a selection of upper and lower frame profiles of different lengths and matching shutter flaps of different widths, and corner connections for joining the lateral frame profiles to the upper and lower frame profiles, wherein the upper and lower frame profiles of differing lengths and the shutter flaps of different matching widths may be mounted by means of the corner connectors to an air supply shutter having a desired throughput rate.

Such a kit allows the user of the air supply shutter to adapt, by simple means, the air supply shutter to the desired rate of air throughput, by designing and dimensioning the lateral frame profiles for any size of air supply shutter from the outset, and, depending on the rate of air throughput, by joining the deflected upper and lower frame profiles by means of corner connections to a frame for such an adapted air supply shutter, wherein a shutter flap of corresponding width is then mounted rotatably in the frame.

These and other advantages of the invention will be further understood and appreciated by those skilled in the art by reference to the following written specification, claims and appended drawings.

A preferred embodiment shall now be described with reference to the Figures.

DETAILED DESCRIPTION OF THE PREFERRED EMBODIMENTS

Figure 1:
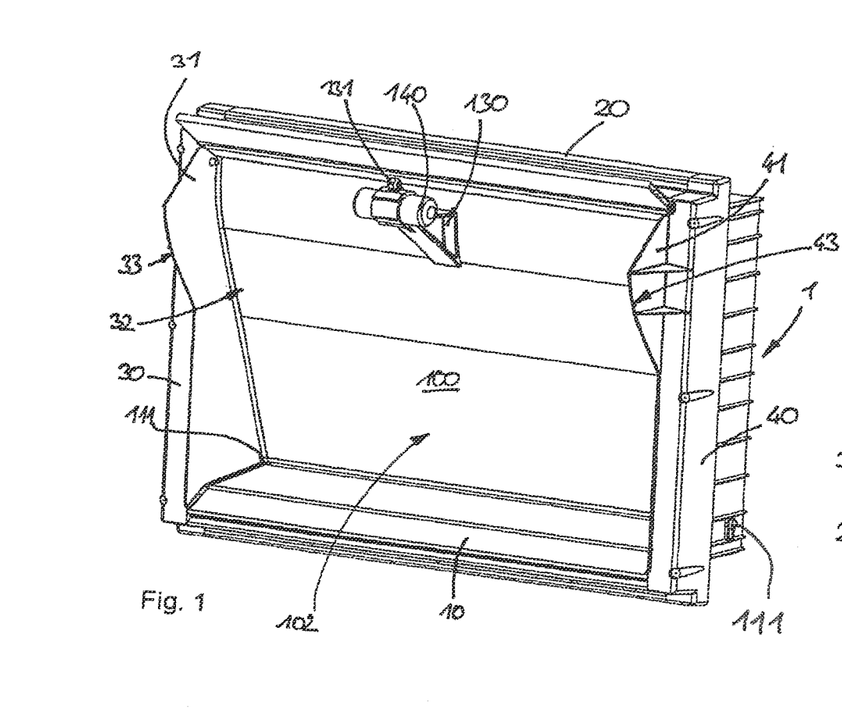
FIG. 1 shows a perspective front view, from the side and from above, of the air supply shutter according to the invention, in a closed position.
Figure 4:
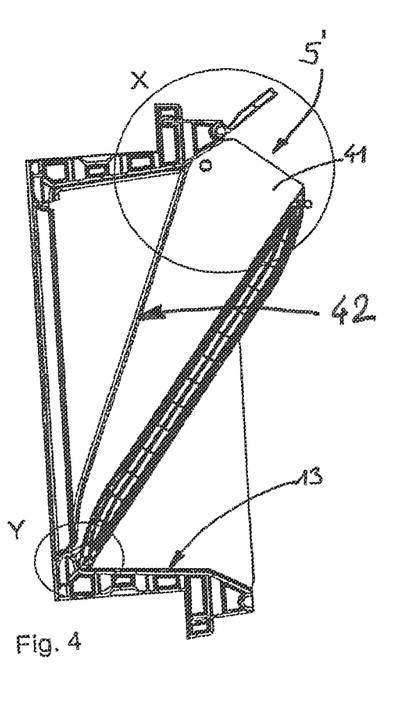

For purposes of description herein, the terms "upper", "lower", "right", "left", "rear", "front", "vertical", "horizontal" and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
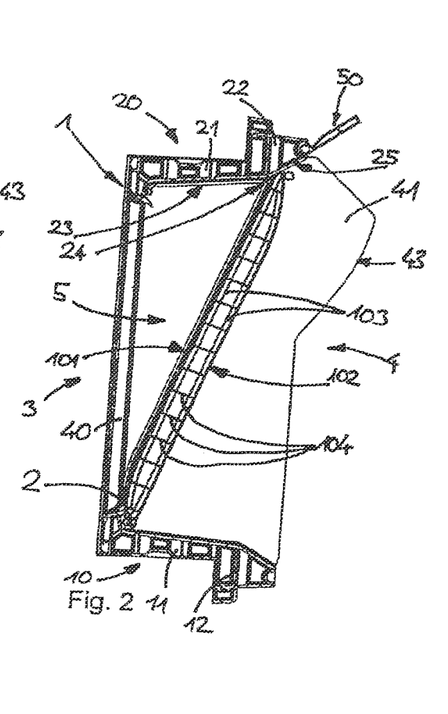
FIG. 2 shows a cutaway side view of the air supply shutter, in the closed position.

Referring first to FIGS. 1 and 2, the embodiment shown comprises a frame 1, in which a shutter flap 100 is pivotably mounted about an axis 2.

Frame 1 comprises a lower frame profile 10, an upper frame profile 20 and two lateral frame profiles 30, 40 which join the upper and lower frame profiles 10, 20 to each other.

As can well be seen in FIG. 2, in particular, the lower and upper frame profiles have a first portion 11, 21, which is inserted into an opening in an outside wall of a building to be ventilated, and a second portion 12, 22, which forms larger outer dimensions than the first portion of the frame and abuts the inner wall surfaces of the external wall of the building and in this way provides a lining of the wall opening. The lateral frame profiles 30, 40 are configured identically to the right-hand lateral frame profile 40 visible in FIG. 1.

Frame profiles 10, 40 are joined at the four corners of frame 1 by means of corner connectors (not shown), which are L-shaped and inserted accordingly into cavities in the frame profiles.

The direction in which air flows through the depicted air supply shutter is from left to right in FIG. 2. Shutter flap 100 is pivotably mounted in the lateral frame profiles 30, 40 by means of two axle pins 110, 111, immediately adjacent the lower frame profile 10. Axle pins 110, 111 are disposed on the inlet side of the frame. From the horizontal swivel axis defined by axle pins 110, 111, shutter flap 100 extends slantingly upwards and is tilted in the direction of the outlet side.

Shutter flap 100 is embodied as a multi-chamber hollow plate, in order, by means of the insulation thus achieved, to prevent condensation from forming on the shutter flap 100 and in order to provide beneficial thermal insulation in the closed state. To this end, shutter flap 100 consists of a wall surface 101 facing the inlet side in the closed state and a wall surface 102 facing the outlet side in said state, between which wall surfaces a cavity is formed that is subdivided into several sections by transverse and longitudinal ribs 103, 104.

Commencing on the inlet side 3 of the air supply shutter, the inner wall of the upper frame profile 20 extends upwards with a small angle of incline in the direction of the outlet side 4 of the air supply shutter. The slightly upwardly sloping inner wall section 23 of the upper frame profile, thus defined, transitions at a line 24 into a wall section 25 which slants upwards more strongly than wall section 23.

In the closed position shown in FIGS. 1 and 2, upper edge 120 of shutter flap 100 abuts said upwardly slanting wall section 25, thus sealing an air passage cross section 5 in the upper region of frame 1, by means of a post-coextruded seal embodied on edge 120.

A weight 140 functioning as an actuator is fixed on shutter flap 100 to an extension arm 130 as a coupler, said weight pulling shutter flap 100 into the open position. Also located on extension arm 130 is a fixing eyelet 131 to which a cable pull or a mechanical rod may be attached in order to move shutter flap 100 into the closed position.

Also disposed on upper frame profile 20 is an air guiding flap 50 which extends across the entire length of upper frame profile 20 and which will be described in detail below.

Air guiding surfaces 31, 41 are formed on lateral frame profiles 30, 40, said surfaces extending in the upper region from approximately half way along the length of the lateral frame profiles in the direction of outlet opening 4. Air guiding surfaces 31, 41 are dimensioned so that they laterally cover a circular segment defined by horizontal axis 2 and the radius of shutter flap 100, as far as an opening angle of the shutter flap of approximately 20 degrees, which corresponds to an effective vent opening of approximately 30 percent.

In the closed position shown in FIGS. 1 and 2, the shutter flap sealingly abuts in its lateral regions a sealing edge 32, 42 embodied on lateral frame profiles 30, 40 and which extends slantingly in the closed position, like shutter flap 100, from the lower region of inlet side 3 to the upper region of outlet side 4.

Figure 3:
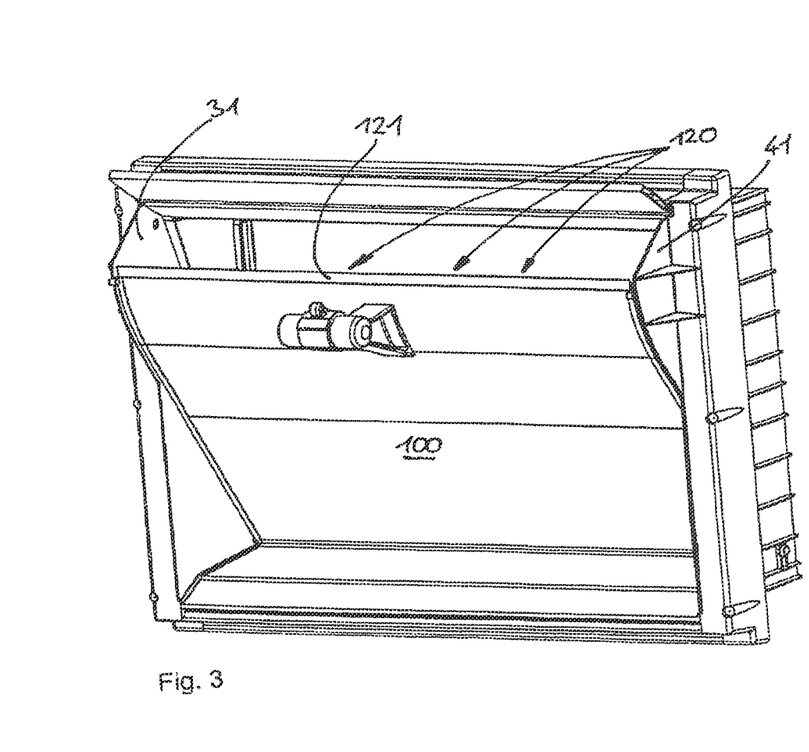
FIGS. 3 and 4 show views of the air supply shutter corresponding to FIGS. 1 and 2, in a position in which the shutter is opened by 30 percent.
Figures 5, 6, 7, 8:
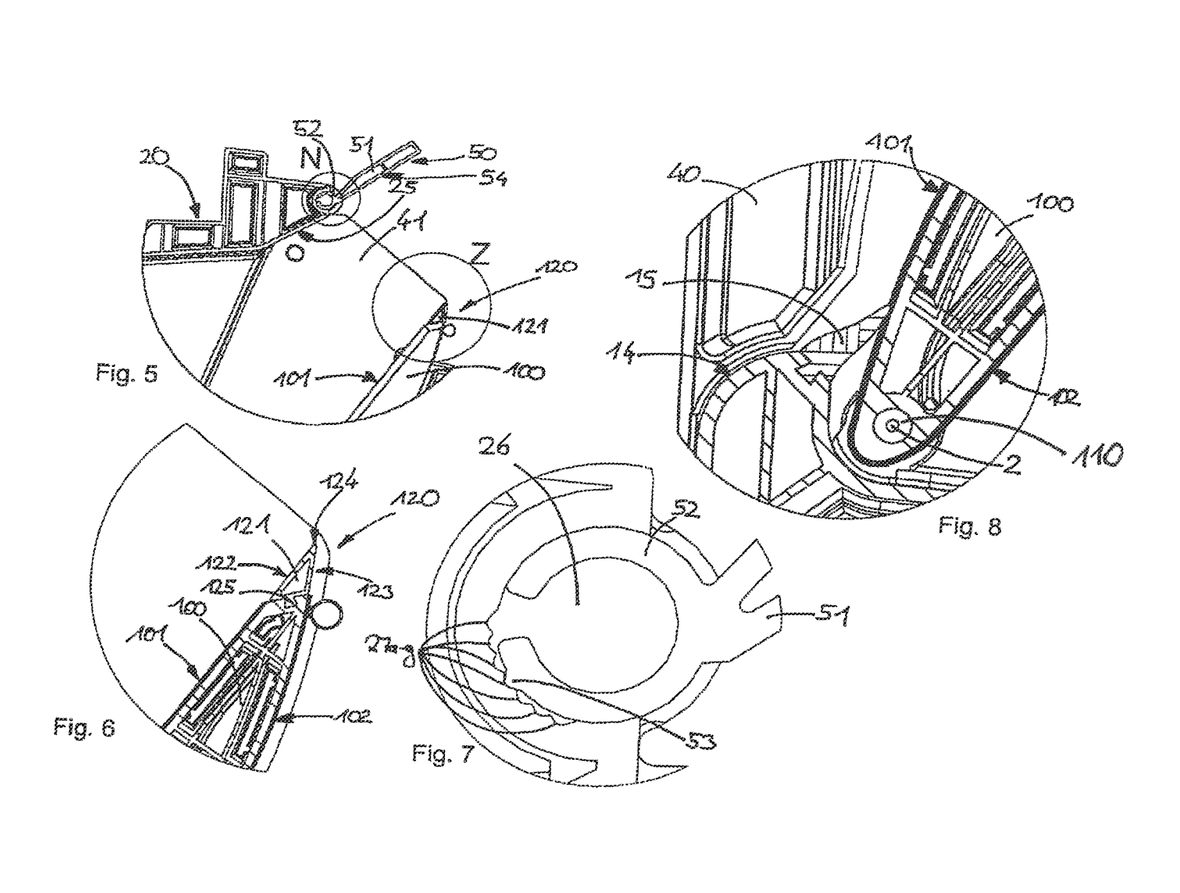
FIG. 5 shows a detailed view of section X in FIG. 4.
FIG. 6 shows a detailed view of section Z in FIG. 5, in a cutaway view.
FIG. 7 shows a detailed view of section N in FIG. 5.
FIG. 8 shows a detailed view of section Y in FIG. 4.

FIGS. 3 and 4 show the air supply shutter in a partially open position; FIGS. 5-7 show details of the air supply shutter in said position. In the partially open position shown, shutter flap 100 is pivoted by approximately 20 degrees about horizontal axis 2. In this open position, wall 102 of shutter flap 100 facing the outlet side is aligned in its upper region with the edges 33, 43 of air guiding surfaces 31, 41 which face the outlet side 4. In this position, the air supply shutter forms a narrow opening cross section, marked in FIG. 4 with the reference sign 5'. Due to the large pressure drop to the interior of the building to be ventilated, the air flowing through air passage cross section 5 flows through said narrow opening cross section 5' at high speed. The air passing through is prevented by air guiding surfaces 31, 41 from escaping out the sides of the air supply shutter and instead is guided in a straight, upwardly directly stream of air to the ceiling area of the building to be ventilated.

FIG. 5 shows a detailed view, from the region of air passage cross section 5', of the inventive air supply shutter in a partially open position. It can be seen that air guiding flap 50 is embodied as a substantially rectangular hollow profile 51 which has a longitudinally slit cylindrical profile 52 at the edge where it is fixed. Said cylindrical profile 52 is inserted into a matching groove 26 acting as a mating receiving portion embodied in cross section as a circular segment spanning more than 180 degrees, and is held in said groove positively and force-lockingly by elastic forces. Groove 26 is embodied in the edge of upper frame profile 20 facing the outlet side 4.

A plurality of locking grooves 27*a-g* are formed on the bottom of groove 26. Both groove 26 and locking grooves 27*a-g* extend across the entire length of the upper frame profile 20.

A locking protrusion 53 with a shape matching that of locking grooves 27*a-g* is formed on cylindrically-shaped portion 52 thus providing a coupling section. In the position of air guiding flap 50 shown in FIGS. 5 and 7, locking protrusion 53 is latched into the middle of seven locking protrusions 27*a-g* and in this position an air guiding surface 54 of air guiding flap 50, facing air passage cross section 5', is aligned with the upwardly slanting wall section of the upper frame profile.

FIG. 6 shows in detail the upper sealing edge 120 of the shutter flap which lies opposite the bearing side. As can be seen, an elastomeric hollow chamber seal 121 is formed on said sealing edge 120, which can be carried out in a post-coextrusion process. Hollow chamber seal 121 is triangular in cross section and has a first external surface 122 facing the inlet side, said surface lying in alignment and planar with wall surface 101 on the inlet side. A flow of air onto wall surface 101 as far as the region of sealing edge 120 is achieved in this manner.

A web 125 of dovetail cross section is formed on hollow chamber seal 121, said web being inserted into a matchingly shaped longitudinal groove in the edge of shutter flap 100, thus fixing the hollow chamber seal in a form-locking manner to shutter flap 100.

On its side facing the outlet side, hollow chamber seal 121 has a second wall surface 123. Said second wall surface 123 and first wall surface 122 abut each other at sealing edge 120, where they form a sharp breakaway edge 124, which prevents eddy formation and any resultant ice formation in the region of hollow chamber seal 121.

As a person skilled in the art can well imagine from FIG. 5, in particular, breakaway edge 124 also forms the actual linear sealing edge which abuts the slanting wall section 25 of the upper frame profile when closing shutter flap 100. Owing to its elastomeric properties, hollow chamber seal 121 is able to deform during this closing operation, in particular by deforming the outer second wall surface, for example by bending, thus abutting the slanting wall portion to form a flush and reliable seal. This seal is achieved, in particular, by cooperation of the elastomeric hollow chamber seal 121 with the specific inclination of wall section 25.

FIG. 8 shows a detailed view of the shutter flap and of the lower frame profile 10 in the region of the horizontal pivot axis 2. It can be seen that a rounded edge 14 facing inlet side 3 or the inside of air passage cross section 5 of the air supply shutter forms a post-coextruded elastomeric seal 15 on lower frame profile 10, said seal abutting the wall surface of shutter flap 100 facing inlet side 3 when in the partially open position as shown. This abutment is further reinforced in the closed position, with the result that elastomeric seal 15, both in the closed position and in the partially open position as shown, prevents air from flowing in from inlet side 3 through the gap between the shutter flap and the lower frame profile.

Figures 9, 10:
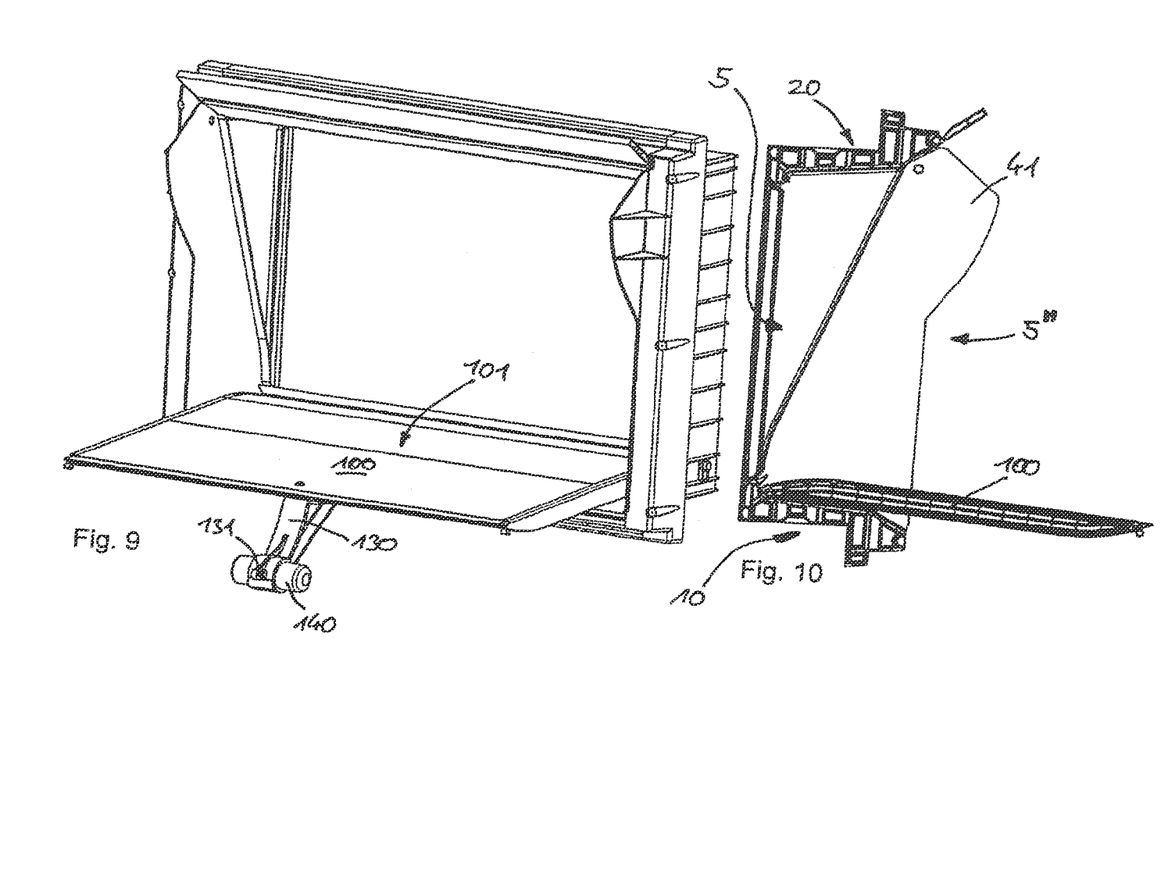
FIGS. 9 and 10 show views of the air supply shutter according to FIGS. 1 and 2, in a fully opened position.

FIGS. 9 and 10 show the embodiment of the air supply shutter in the fully open position. As can be seen, an air passage cross section 5" which substantially corresponds to air passage cross section 5 is released in this position. In this fully open position, shutter flap 100 slants slightly downwards from inlet side 3, as a result of which water is prevented from collecting in the region of the air supply shutter. This slant is made possible by the fact that upper frame profile 20 and lower frame profile 10 are identical in cross section and hence that the wall surfaces 102 of the shutter flap facing the outlet opening abut a downwardly sloping wall surface 13 of the lower frame profile, said wall surface 13 corresponding to wall surface 23.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An air supply shutter for ventilating closed buildings, comprising:
   a marginal frame comprising four unitary components: an upper frame member, a lower frame member and first and second lateral frame members, said unitary components being interconnected to define therebetween a centrally disposed air vent opening having an inlet side and an outlet side;
   a shutter flap pivotally mounted on said frame for rotation about a horizontal pivot axis between a closed position wherein an upper sealing edge of said shutter flap abuts the upper frame member and prevents air from flowing through said air vent opening, a partially open position wherein said shutter flap, said upper frame member, and said first and second lateral frame members alone guide the flow of air through said air vent opening, and a fully opened position wherein said shutter flap permits air to flow through said air vent opening; and
   a coupler operably connected with said shutter flap and configured for engagement with an actuator for shifting said shutter flap between said closed position and said open position;
   wherein said upper frame member includes an air guiding inner wall which is disposed on an outlet side of said air vent opening, faces said air vent opening, and extends upwardly at a non-zero angle of incline in the direction of the outlet side relative the horizontal, said lower frame member includes a supporting wall which is disposed on said outlet side of said vent opening, faces said vent opening, and extends downwardly at a non-zero angle of incline in the direction of the outlet side relative the horizontal, and the shutter flap in the fully opened position slants downwardly from said outlet side and abuts the supporting wall, and wherein
   said upper frame member and said lower frame member have an identical cross-sectional configuration, and are disposed on said marginal frame in a mirror-inverted relationship relative to each other about a horizontal plane, such that the predetermined angle of the air guiding inner wall of the upper frame member and the supporting wall of the said lower frame member are equal.

2. An air supply shutter as set forth in claim 1, wherein:
   said air guiding wall extends across the entire length of said upper frame member.

3. An air supply shutter as set forth in claim 1, including:
   side air guide surfaces disposed on said first and second lateral frame members, extending outwardly therefrom in the direction of airflow through said air vent opening, and being configured such that they laterally seal the space between said marginal frame and said shutter flap when said shutter flap is in the partially open position.

4. An air supply shutter as set forth in claim 3, wherein: said partially open position of said shutter flap provides an airflow opening in the range of 20 to 40 percent of the maximum airflow opening through said air vent opening in said open position.

5. An air supply shutter as set forth in claim 3, wherein: said horizontal axis extends through said first and second lateral frame members at a location adjacent to said lower frame member, and said side air guide surfaces are disposed on said first and second lateral frame members at a location adjacent to said upper frame member.

6. An air supply shutter as set forth in claim 1, including: an air guiding flap pivotally mounted on said upper frame member and extending across the entire length of said frame member and having a coupling section inserted into a mating receiving portion of said upper frame member, and wherein said coupling section includes a rounded edge, which is inserted into a groove in said receiving portion, and includes a locking protrusion extending across the entire length of said rounded edge which cooperates with at least one of a plurality of locking grooves extending across the entire length of the receiving groove in order to releasably retain said air guiding flap in a selected one of a plurality of different positions.

7. An air supply shutter as set forth in claim 6, wherein: said air guiding flap includes an air guiding surface which can be aligned with said air guiding inner wall of said upper frame member in one of said different positions.

8. An air supply shutter as set forth in claim 6, wherein: said air guiding flap includes a multi-chamber hollow construction with internal spaces extending in a horizontal direction parallel with the pivot axis of said air guiding flap.

9. An air supply shutter as set forth in claim 1, wherein: said shutter flap is pivotally mounted about said horizontal axis adjacent to a bearing edge portion of said marginal frame which abuts with said shutter flap in said closed position, and
said shutter flap sealingly abuts said upper frame member along a sealing edge portion of said shutter flap, which is disposed opposite said bearing edge on said marginal frame.

10. An air supply shutter as set forth in claim 9, wherein: said sealing edge portion of said shutter flap sealingly abuts against said air guiding inner wall of said upper frame member in said closed position.

11. An air supply shutter as set forth in claim 9, including: an elastomeric seal mounted on said sealing edge portion of said shutter flap.

12. An air supply shutter as set forth in claim 9, wherein: said upper frame member includes an inlet wall surface which extends as far as said sealing edge portion of said shutter flap, such that the stream of air passing through said air vent opening contacts said inlet wall surface in either said open or said closed position.

13. An air supply shutter as set forth in claim 12, wherein: said inlet wall surface terminates at said sealing edge in a sharp breakaway edge.

14. An air supply shutter as set forth in claim 1, including: a restoring device which exerts a force on said shutter flap to bias said shutter flap toward one of said open position and said closed position.

15. An air supply shutter as set forth in claim 14, wherein: said restoring device includes a weight disposed on said shutter flap at a predetermined distance from said horizontal axis to bias said shutter flap toward said open position.

16. An air supply shutter as set forth in claim 1, wherein: each of said first and second lateral frame members includes a sealing surface disposed parallel to said shutter flap in said closed position, against which said shutter flap abuts.

17. An air supply shutter as set forth in claim 1, wherein: said horizontal axis is disposed through said first and second lateral frame members at a location disposed adjacent to said lower frame member; and including
two elastomeric seals, a first of said elastomeric seals disposed along a top portion of said shutter flap and a second of said elastomeric seals disposed along a bottom portion of said shutter flap which seal with said marginal frame when said shutter flap is in said closed position.

18. An air supply shutter as set forth in claim 1, wherein: said shutter flap includes a multi-chamber, hollow construction, with interior spaces extending horizontally along the pivot axis of said shutter flap.

19. An air supply shutter as set forth in claim 1, wherein: said shutter flap has a multi-chamber, hollow construction with subdividing partitions disposed parallel to an exterior wall surface of said shutter flap facing said inlet side which extend parallel to the pivot axis of said shutter flap.

20. An air supply shutter as set forth in claim 18, wherein: said shutter flap includes subdividing ribs on at least one inner portion thereof which lie perpendicular to an exterior wall surface of said shutter flap facing said inlet side in said closed position.

21. An air supply shutter kit for fabricating an air supply shutter having a marginal frame comprising four unitary components: an upper frame member, a lower frame member, and first and second lateral frame members, the kit comprising:
a plurality of standardized unitary lateral frame members having different preselected sizes;
a plurality of unitary upper and lower frame members having different preselected lengths;
a plurality of closable matching shutter flaps having different preselected widths, each shutter flap having an upper sealing edge for sealing the air supply shutter and a pivotable opposite edge for mounting each shutter flap to the air supply shutter;
a plurality of corner connectors joining said lateral frame members with said upper and lower frame members, whereby said upper and lower frame members of differing lengths and said shutter flaps of different matching widths may be mounted to a ventilation opening of a closed building using said corner connectors to an air supply shutter having a desired throughput rate, wherein the lateral frame members, shutter flaps, and upper frame members alone guide the flow of air through the ventilation opening when the shutters are in a partially open position, and
said upper frame members and said lower frame members having an identical cross-sectional configuration, wherein each of said upper frame member and lower frame member have a wall extending outwardly at an equal non-zero inclined angle relative the horizontal, and being disposed on said lateral frame members in a mirror-inverted relationship relative to each other about a horizontal plane.

* * * * *